US007711442B2

(12) United States Patent
Ryle et al.

(10) Patent No.: US 7,711,442 B2
(45) Date of Patent: May 4, 2010

(54) AUDIO SIGNAL PROCESSOR WITH MODULAR USER INTERFACE AND PROCESSING FUNCTIONALITY

(75) Inventors: Marcus Ryle, Westlake Village, CA (US); Michel A. Doidic, Westlake Village, CA (US)

(73) Assignee: Line 6, Inc., Calabasas, CA (US)

(*) Notice: Subject to any disclaimer, the term of this patent is extended or adjusted under 35 U.S.C. 154(b) by 1067 days.

(21) Appl. No.: 10/948,585

(22) Filed: Sep. 23, 2004

(65) Prior Publication Data

US 2006/0064186 A1 Mar. 23, 2006

(51) Int. Cl.
*G06F 17/00* (2006.01)

(52) U.S. Cl. .......... 700/94

(58) Field of Classification Search .......... 700/94; 84/662, 663, 701, 702, 737, 738; 361/792–731; 381/118
See application file for complete search history.

(56) References Cited

U.S. PATENT DOCUMENTS 4,509,190 A * 4/1985 Spector .......... 381/61
5,079,536 A * 1/1992 Chapman .......... 338/99
5,883,804 A * 3/1999 Christensen .......... 700/94
6,069,311 A * 5/2000 Hiramatsu .......... 84/659
6,376,761 B1 * 4/2002 LaMarra et al. .......... 84/670
7,326,849 B2 * 2/2008 Adams et al. .......... 84/746
2002/0065568 A1 5/2002 Silfvast et al.

OTHER PUBLICATIONS

KORG USA, Inc., PME-40X Modular Powered Pedal Board Product Description, 1985.
Yamaha Corporation of America, Magicstomp Compact Design Stereo Stomp Box Product Announcement, Sep. 26, 2003, 3 pgs.
PCT International Search Report, Mar. 30, 2006.

* cited by examiner

*Primary Examiner*—Andrew C Flanders
(74) *Attorney, Agent, or Firm*—Blakely, Sokoloff, Taylor & Zafman LLP

(57) ABSTRACT

Disclosed is an audio signal processor that determines the type of audio processing to be performed utilizing an audio processing device (APD) and a removable module. The APD includes a digital signal processor (DSP) that modifies an input audio signal in accordance with a signal processing instruction set. The removable module includes the signal processing instruction set, and when the removable module is coupled to the APD, the signal processing instruction set is transferred to and implemented by the DSP of the APD to perform an audio processing function upon the input audio signal. The removable module may also include a user interface having at least one control to set a control parameter that is transferred to the DSP of the APD to further modify audio processing. The APD may also include a multi-state footswitch whose functionality can be determined by the DSP.

25 Claims, 7 Drawing Sheets

AUDIO SIGNAL PROCESSOR WITH MODULAR USER INTERFACE AND PROCESSING FUNCTIONALITY

BACKGROUND

1. Field of the Invention

This invention relates to the processing of audio signals generated by musical instruments. In particular, the invention relates to an audio signal processor having its controls and processing functionality being removable from a base audio processing device.

2. Description of Related Art

Many musical instruments today, including keyboards, electronic drums, and electric stringed instruments, generate their audio output via electronic means. In particular, the electric guitar is comprised of a stringed instrument with magnetic pickups utilized to create an electric voltage that represents the audio signal of the instrument. In order for an electric guitar to be heard at a reasonable level, it is connected to an amplifier and loudspeakers.

The tonal properties of an electric guitar are the combined result of the instrument itself, as well as any circuits that exist in its signal path including the amplifier and the loudspeakers used. A musician may select a particular instrument, amplifier, and loudspeakers in order to achieve a specific desired sound. To have further control over the sound, effects processors commonly known as “stomp boxes” can be inserted in the signal path between the electric guitar and the amplifier.

Many hundreds of different effect circuits have been created for guitarists to insert into their signal path. These devices typically are housed in a small metal box with a few control knobs on top and a footswitch for turning the effect off and on. The effect that each different unit may generate is predetermined by the circuitry it contains and the controls that are used to adjust the effect’s parameters.

When a musician desires to modify the audio signal in a different way than by the stomp boxes he currently is using, another stomp box may be added to the signal chain or may be used to replace an existing stomp box. The sonic range of a given stomp box is determined when it is designed, and other than through physical modification by the user, that designed sonic range is all that can ever be generated.

In order to achieve a diverse array of well-known or classic types of guitar tones, a guitarist has traditionally been required to use many different guitars, amplifiers, and effects, including stomp boxes. With regards to the effects, digital signal processing (DSP) techniques have been developed that provide the user with a wider range of tone than previously available with analog effect circuitry. Although multiple devices may still be required for achieving specific sonic results, the available sounds on each effect unit can include digital emulations of many traditionally analog effects. But in these digitally-based systems, their functionality is still limited to the range of sounds designed into the device at the time of manufacture.

Most recently, some DSP-based effects have provided a means for updating their firmware via a computer interface such as Universal Serial Bus (USB). In this manner, the range of sound available to the musician can be modified via computer software, allowing the effect unit to be updated with new capabilities in the future. However, these developments do not provide a convenient method of changing an effect unit’s capabilities without a computer.

BRIEF DESCRIPTION OF THE DRAWINGS

The features and advantages of the present invention will become apparent from the following description of the present invention in which.

DETAILED DESCRIPTION

Figure 1:
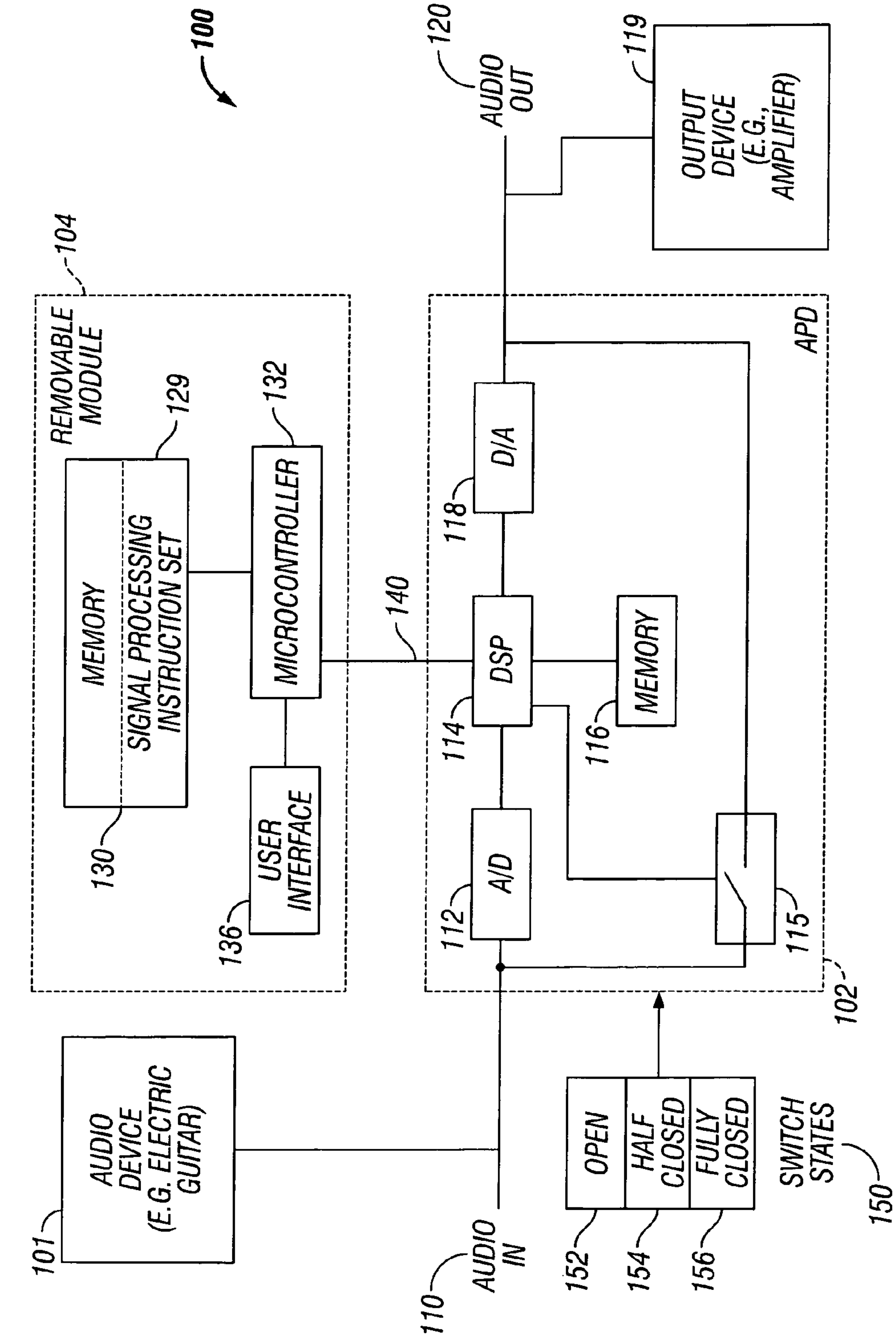
FIG. 1 is a block diagram illustrating a removable module that may be attached to an audio processing device having embedded digital signal processing capabilities, according to one embodiment of the invention.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

Generally, embodiments of the invention relate to an audio signal processor with a removable module that determines the type of audio processing to be performed. More particularly, embodiments of the invention relate to an audio signal processor having a base audio processing device and a removable module that is coupled to the audio processing device, wherein, the removable module determines the type of audio processing to be performed.

The audio processing device includes a digital signal processor that modifies an input audio signal in accordance with a signal processing instruction set. The removable module includes the signal processing instruction set, and when the removable module is coupled to the audio processing device, the signal processing instruction set is transferred to and then implemented by the digital signal processor of the audio processing device to perform an audio processing function upon the input audio signal. The removable module may also include a user interface having at least one control to set a control parameter that is transferred to the digital signal processor of the audio processing device to further modify audio processing.

In one embodiment, the audio processing device is intended for use with an electric guitar. The analog voltage output of an electric guitar is connected to the audio input of the audio processing device. An analog to digital converter converts the voltage into a digital signal. Further, the digital signal processor (DSP) located within the audio processing device processes the audio signal to create the desired effect for the guitarist. The removable module determines what type of processing the DSP is expected to perform.

In some embodiments of the invention, the removable module contains the specific instruction set that the DSP is intended to execute and may also include user controls, such as knobs and switches, to enable the user to modify parameters of the desired audio effect. Movement of these controls is passed from the removable module to the DSP in order for the audio result to be heard.

Embodiments of the invention further provide for a user to insert different types of removable modules into the audio processing device in order to provide the user with a wide range of different types of effects. Additionally, the user can exchange modules between multiple audio processing devices arranged in a serial fashion in order to change the order in which the audio signal will be processed. Thus, embodiments of the invention provide a much more affordable and versatile solution to adding audio effects to an electric guitar than in the past.

With reference now to FIG. 1, FIG. 1 shows a block diagram of an audio signal processor 100 having an audio processing device (APD) 102 and a removable module 104, according to one embodiment of the invention. Embodiments of the invention relate to an audio processing device (APD) 102 having embedded digital signal processing (DSP) capabilities and a removable module 104. The removable module 104 contains signal processing instructions stored as a signal processing instruction set 129 and a user interface 136.

In one embodiment, the audio processing device 102 and removable module 104 for use therewith, is intended for use with an electric guitar, and hereinafter embodiments of the invention will be discussed with reference to use with an electric guitar. However, it should be appreciated that embodiments of the invention can be utilized with any audio device 101 having an analog or digital audio signal that can be transmitted to the audio processing device 102 for digital signal processing upon the inputted audio signal. Therefore, it should be appreciated that embodiments of the invention can be utilized with any audio device 101 producing an audio signal that can be processed.

Looking particularly at the audio processing device 102, the audio processing device 102 includes an analog to digital converter (A/D converter) 112 coupled to a digital signal processor (DSP) 114. DSP 114 is further coupled to a memory 116 and a digital to analog (D/A) converter 118. It should be appreciated that in the case of an input audio device 101 that outputs a digital audio signal, the A/D converter 112 is not required.

For example, the analog voltage output of an electric guitar may be connected to the audio input (AUDIO IN 110) of the audio processing device 102. In one example, a standard guitar cable may be inserted into audio input jack 110. The A/D converter 112 converts the voltage into a digital signal that is inputted into the digital signal processor 114 for digital signal processing. Particularly, digital signal processor 114 processes the digitized audio signal to create a desired guitar effect for the guitarist.

A removable module 104 determines what type of processing the digital signal processor 114 is to perform. In one embodiment, the digital signal processor 114 may be a standard digital signal processor produced by Motorola®. It should be appreciated that digital signal processors and the implementation of DSP algorithms to create desired guitar effects or other musical effects is well known in the art.

After digital signal processing of the inputted digital signal as played by the guitarist occurs to create the digital effect, then this digitally processed signal is converted back to analog form by digital to analog D/A converter 118, and the processed analog signal is outputted through audio output 120 to a cable or to other means for transmission to an output device 119 such as an amplifier or speaker for playback. It should be appreciated that if said output device 119 accepts a digital audio signal, then D/A converter 118 is not required.

Also, it should be noted that audio processing device 102 may also include additional memory 116 to provide for overflow memory for the DSP 114 in cases where the DSP's internal memory becomes overloaded. More particularly, memory 116 may be utilized as delay or echo memory in addition to the digital signal processor's internal memory in order to enhance certain type of effects such as echo and delay. Memory 116 may be a type of Random Access Memory (RAM) such as SRAM, DRAM, etc.

The removable module 104 may be removably coupled to the audio processing device 102 by interface 140. Particularly, a serial interface may be utilized to connect the removable module 104 to the audio processing device 102. In one embodiment, a serial interface 140 may be utilized such as a 14-pin connector serial interface. In an even more detailed embodiment, the removable module 104 includes a 14-pin male serial connector that mates with a complementary female serial interface of a printed circuit board of the audio processing device 102. Thus, through the interface 140, the removable module 104 may be electrically coupled and decoupled from the audio processing device 102.

Looking particularly at the removable module 104, the removable module 104 includes particular digital signal processing instructions to create a particular audio guitar effect.

These digital signal processing instructions are stored as signal processing instruction set 129 in memory or firmware 130. This digital signal processing instruction set is coupled and transmitted through serial interface 140 to the digital signal processor 114 of the audio processing device 102 such that the digital signal processor 114 can execute the signal processing instruction set in order to implement the audio effect upon the inputted guitar signal processed through the audio processing device 102. Memory or firmware 130 may include any suitable type of permanent or writeable type of memory including but not limited to: Read Only Memory (ROM), PROM, EPROM, EEPROM, magnetic or optical disk, etc.

In one embodiment, the removable module 104 may include a microcontroller 132 coupled to a user interface 136 and the memory 130.

The user interface 136 may include a number of controls such as knobs and switches to enable a user of the integrated audio signal processor 100, including audio processing device 102 having a removable module 104 attached therewith, to modify parameters of the audio effect.

These control parameters may be passed by microcontroller 132 onto the digital signal processor 114 of the audio processing device 102. In one embodiment, the microcontroller may be a Philips® microcontroller. The microcontroller 132 may be utilized to pass the signal processing instructions from the removable module 104 to the digital signal processor 114 of the audio processing device 102 through serial interface 140, as well as the control parameters. Additionally, the microcontroller 132 may be utilized to interpret, modify, or create the signal processing instructions or the control parameters prior to passing them on to the audio processing device 102.

However, in some embodiments, a microcontroller may not be used and the signal processing instructions and control parameters from the user interface 136 may be directly interfaced to the DSP 114 of the audio processing device 102.

It should be appreciated that a user can insert a wide variety of different types of removable modules 104, each having its own particular effect and associated signal processing instruction set, into the audio processing device 102 in order to alter the type of effect that is expected to be executed by the audio signal processor 100 upon a guitar input signal. Particularly, a wide variety of different removable modules 104 each having a particular effect and a particular user interface may be utilized with the same audio processing device 102. Thus, a plurality of different removable modules may be purchased by a user and utilized with the same audio processing device providing a wide range of different types of audio effects in a simple and low-cost manner.

Examples of these different types of removable modules may include removable modules having signal processing instructions and a user interfaces directed to such well known audio processing effects as: echo, distortion, over-drive, compressor, tremolo, chorus, etc. These and other types of audio effects are well known in the music industry, and particularly as to guitar effects, and the digital signal processing and signal processing instructions to enable these effects, as well as the types of controls and control parameters utilized with these types of effects via user interfaces, are well known to those of skill in this art.

However, with embodiments of the present invention, a single base audio processing device 102 having embedded digital signal processing capabilities can be utilized with a wide range of different types of removable modules 104, each having its own particular type of effect enabled by a specific signal processing instruction set in conjunction with a particular user interface to control effects processing. This provides a low cost and easy system to enable users to obtain a wide variety of different types of effects in a hassle-free manner.

Additionally, a user can exchange removable modules between multiple audio processing devices connected to one another in a serial fashion in order to change the order in which the audio effects will be processed. By having a removable module 104, a much more affordable and versatile solution to adding audio effects to a guitar and other musical instruments is provided.

In one embodiment, the audio processing device 102 includes a switch 150 that may have a plurality of different states. For example, the switch 150 may have three states which can be interpreted by the DSP 114 to perform different functions. In the open state 152, the switch is not depressed. In the half closed state 154, the switch is depressed partially. In the fully closed state 156, the switch is pressed all the way down. Typically, the open state 152 would be used to indicate that the switch is not in the half closed state 154 or the fully closed state 156.

Switch 150 may be a typical manual switch on the audio processing device 102 itself that can be manually finger-switched by a user. However, in one embodiment, switch 150 may be a footpad switch in which a user depresses a footpad switch with his or her foot. A particular embodiment of the switch will be discussed in detail later.

In the footpad switch embodiment, the fully closed state 156 is usually enabled by the user depressing the footpad fully. In one embodiment, each time switch 150 enters the fully closed state 156, the DSP audio effect is alternately enabled or disabled. When enabled, digital signal processor 114 applies the digital signal processing effects and user interface controls of the removable module 104 to the audio input signal of the guitar. When disabled, the DSP audio effects are not applied to the audio input signal of the electric guitar. In one embodiment, the DSP audio effects are disabled by routing the audio in signal 110 directly through to audio out 120 via an audio switch 115 controlled by digital signal processor 114.

The footpad switch may also have added resistance in its travel that occurs when it is partially depressed to the half closed state 154 in order for the user to physically distinguish between the half closed state 154 and the fully closed state 156. The function of the half closed state 154, as well as the fully closed state 156, is determined by the signal processing instruction set 129. These states may be enabled by a double-action footpad switch, as will be discussed.

In one embodiment, the amount of time that passes between occurrences of entering the half closed state 154 is used to determine the tempo or speed of a particular DSP audio effect. The half closed state allows the user to tap the footpad at a particular tempo and the outputted effect sound will match that tempo. The changing of tempo via the half closed state may occur whether the DSP audio effect is currently enabled or disabled.

Figure 2A:
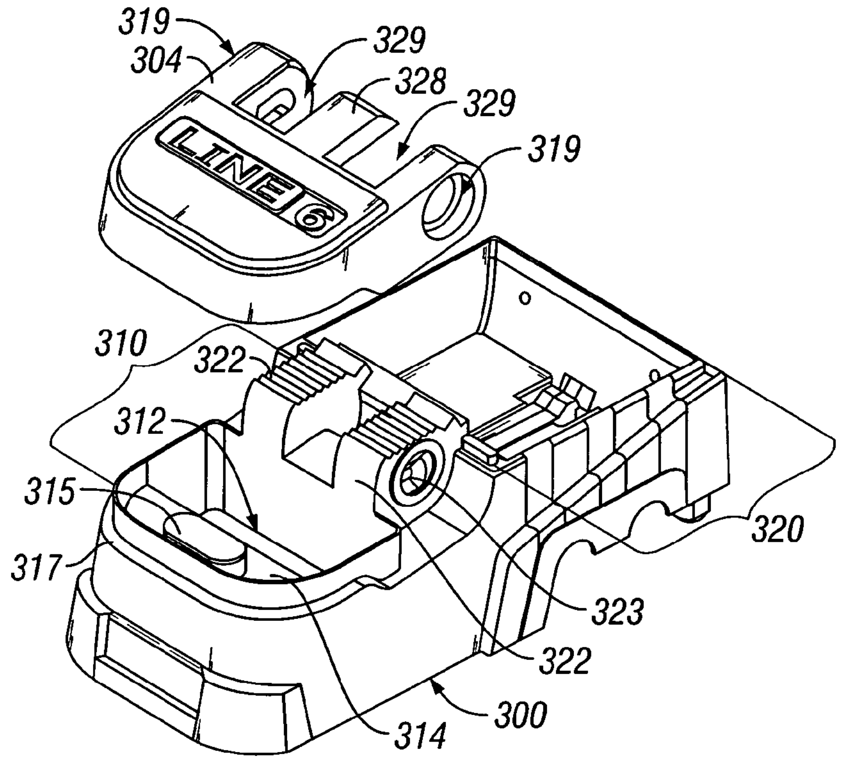
FIG. 2A is a perspective view of a housing of an audio processing device, according to one embodiment of the invention.

Turning now to FIG. 2A, FIG. 2A is a perspective view of an example of a housing 300 for the audio processing device 102, according to one embodiment of the invention. As can be seen in FIG. 2A, the housing 300 of the audio processing device is generally rectangular and oblong in shape and includes a front section 310 for mounting a foot pad switch 304.

The audio processing device housing 300 includes a front section 310 for the mounting and receipt of the footpad switch 304 and a back section 320 for the receipt of the removable module 104. Within front section 310 of the audio processing device housing 300, a generally rectangular battery recess area 312 is provided for the receipt of a battery (not shown) that may be utilized to power the audio processing device.

Also, adjacent to the battery recess area 312 is a stepped footpad actuation section 314 that mounts a footpad state selector 315 directly under the footpad switch 304. The footpad switch 304 may be pivoted downwards to activate the footpad state selector 315.

Particularly, the front section 312 of the audio processing device housing includes a U-shaped recessed area 317 about the outer perimeter of the outer portion of the front section 312 of housing 300 in order to accommodate the footpad switch 304.

Figure 2B:
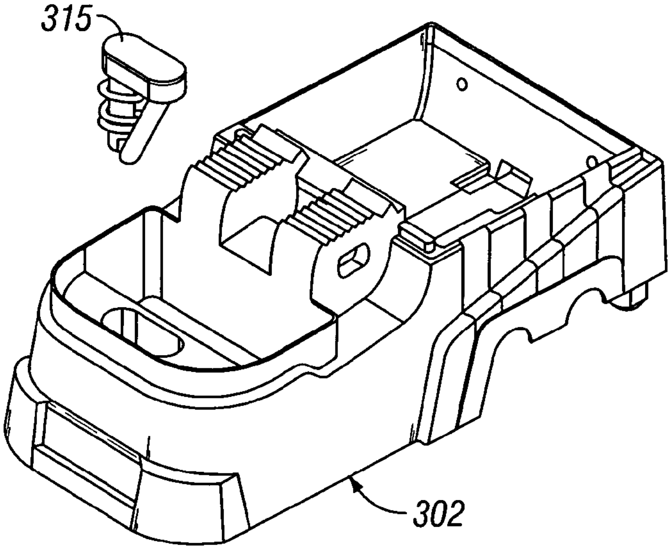
FIG. 2B is a perspective view of a footpad state selector of the audio processing device that may be actuated by a footpad, according to one embodiment of the invention.
Figure 2C:
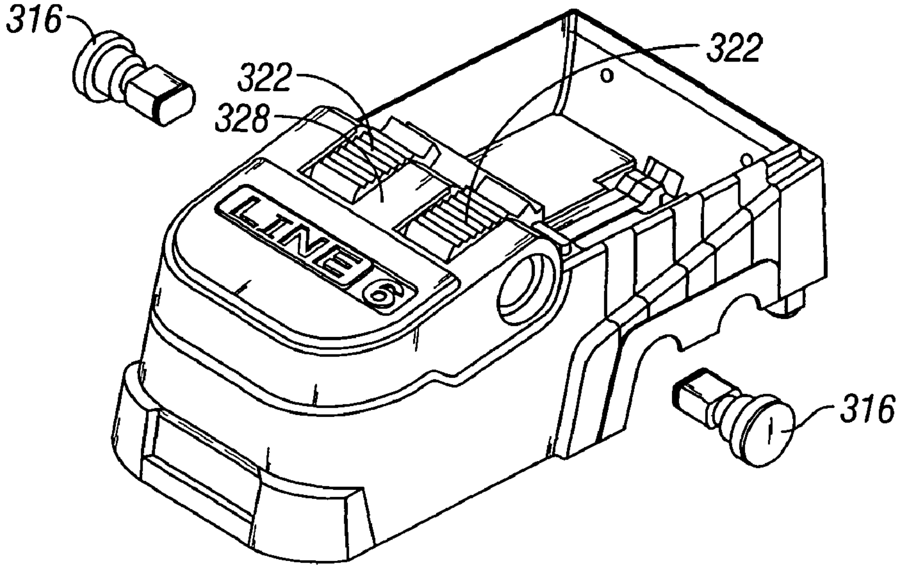
FIG. 2C is a perspective view showing the details of how the footpad is hingedly mounted to the audio processing device housing, according to one embodiment of the invention.

With brief reference also to FIG. 2C, the footpad switch 304 may be rotatably mounted into the U-shaped recessed area 317 of the front section 310 of the audio processing device housing 300 by hinge pins 316.

As can be seen in FIGS. 2A and 2C, the footpad 304 is approximately U-shaped and has two opposed mounting openings 319 for receipt of the mounting hinge pins 316 to rotatably mount the footpad 304 to two opposed rectangular mounting portions 322 of the audio processing device housing 300. The rectangular mounting portions 322 include rectangular openings 323 complementary to the mounting hinge pins 316 such that when inserted the hinge pins 316 rotatably mount the footpad 304 to the audio processing device housing 300. Also, the footpad 304 has a rectangular protrusion 328 that mates between the two rectangular mounting portions 322 and has complementary rectangular openings 329 to accommodate the rectangular mounting portions 322 of the audio processing device housing 300.

It should be appreciated that this is only one example of an audio processing device housing 300 and a rotatably mounted footpad 304 and that many other variations are possible.

Turning briefly to FIG. 2B, FIG. 2B is a perspective view of an example of an audio processing device housing 300 that particularly illustrates an example of a footpad state selector 315 that may be mounted within the audio processing device housing 300 for activation by the rotatable footpad 304. In this example, the footpad state selector 315 is a dual-stage spring actuator for activation by the rotatable footpad switch 304 to thereby create the double-action footpad switch, as previously discussed. The state selector 315 may be mechanically coupled to a footpad switch of a printed circuit board that contains the electronics of the audio processing device 102 as previously discussed with reference to FIG. 1.

Figure 2D:
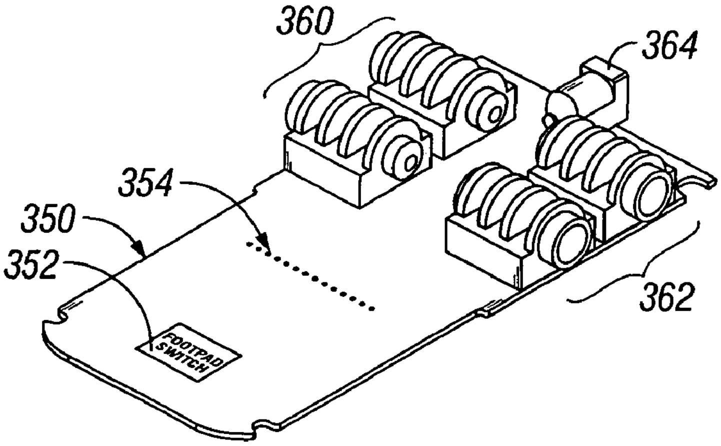
FIG. 2D is a perspective view showing a simplified example of a printed circuit board that may be mounted within the audio processing device, according to one embodiment of the invention.

Particularly, with brief reference now also to FIG. 2D, FIG. 2D provides an example of a printed circuit board (PCB) 350 that may be mounted to the bottom of the audio processing device housing 300. As shown in FIG. 2D, the printed circuit board 350 may include a footpad switch 352 that may be activated by the footpad state selector 315. Based on mechanical input from the dual-stage spring footpad state selector 315 (e.g. a pre-determined amount of force), the footpad switch may change the state of the audio processing device based on the previously discussed switch states: open 152, half closed 154, and fully closed 156.

The printed circuit board (PCB) 350 may mount and interconnect the electronic components of the audio processing device 102, previously discussed, including the A/D converter 112, the digital signal processor 114, the memory 116, and the D/A converter 118. Further, the PCB 350 may further include a 14-pin serial interface to interface with the matching 14-pin serial interface from the removable module 104, as previously discussed.

Also, the printed circuit board 350 may include stereo audio input jacks 362 for receipt of complementary audio input connectors (e.g. from a guitar cable), as well as stereo audio output jacks 360, also for receipt of complementary audio output connectors (e.g. from a guitar cable) such that the digitally processed signal can be transmitted to an amplification device. However, typically, at least for guitars, only one input and output jack are utilized since guitars are typically played in mono. Additionally, printed circuit board 350 may include a power supply input 364 for receipt of a direct current power supply to power PCB 350 and the electronics of the application processing device from a wall socket, for example, instead of utilizing a 9-volt or other type of battery.

Figure 2E:
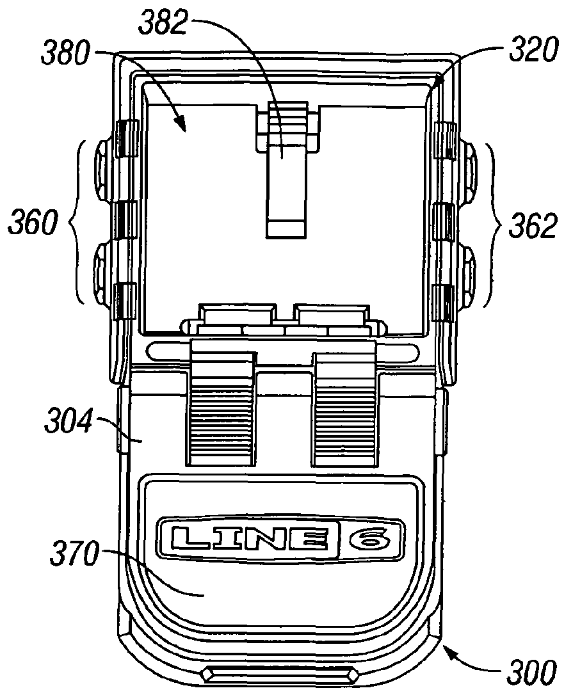
FIG. 2E is a top view of a fully assembled housing of the audio processing device, according to one embodiment of the invention.
Figure 2F:
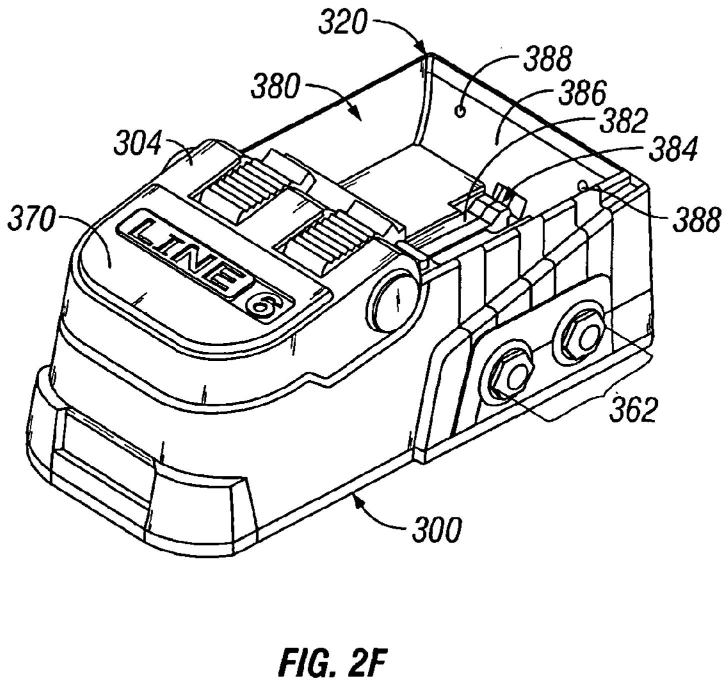
FIG. 2F is a perspective view of a fully assembled housing of the audio processing device, according to one embodiment of the invention.

With reference now to FIGS. 2E and 2F, top and perspective views of a complete audio processing device housing, respectively, are shown. Particularly, these figures show the footpad switch 304 rotatably mounted to the housing 300, as well as, the printed circuit board with audio inputs 362 and audio outputs 360 mounted to the bottom of the housing. For example, the printed circuit board may be mounted to the bottom of the housing and enclosed with a metal plate (not shown).

Also, a rubber pad 370 may be mounted onto the top of the footpad switch 304 to reduce wear and tear on the footpad.

The back section 320 of the audio processing device housing 300 includes an approximately rectangular recessed area 380 for receipt of a removable module 104. As will be discussed, the removable module 104 is also approximately rectangularly-shaped and is sized to fit within the recessed area 380 of the audio processing device housing 300.

Figure 2G:
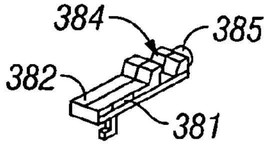
FIG. 2G is a perspective view of a spring-biased latch, according to one embodiment of the invention.

With reference also to FIG. 2G, the audio processing device housing 300 includes a mechanical spring 381 biased latch 382 such that when the complementarily-shaped removable module 104 is inserted into the complementary-shaped rectangular recessed area 380 of the audio processing device housing, it sits flush therein and hook portion 384 of the latch 382 latches onto a complementary approximately triangularly shaped latch portion of the removable module 104 itself to secure the removable module within the recess. The latch 382 includes a button 385 that extends through the back wall 386, that when pushed in, pivots the removable module back out of the recess of the audio processing device housing.

Also, the audio processing device housing 300 along its back wall 386 includes two screw holes 388 in which screws may be inserted through the back wall 386 and into the removable module 104 such that the removable module can be secured therein by screw-type fasteners.

Figure 3A:
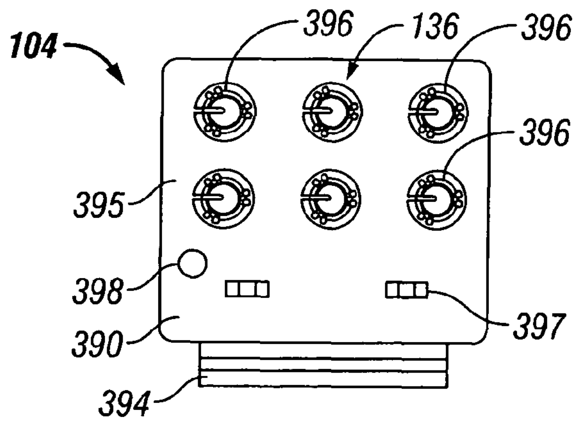
FIG. 3A is a top view of a removable module that may be inserted into an audio processing device, according to one embodiment of the invention.
Figure 3B:
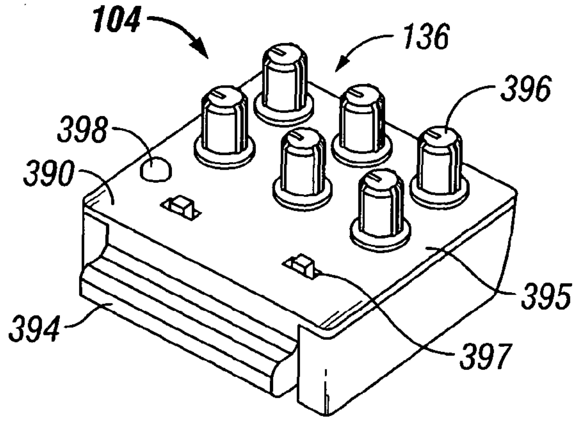
FIG. 3B is a perspective view of a removable module that may be inserted into an audio processing device, according to one embodiment of the invention.
Figure 3C:
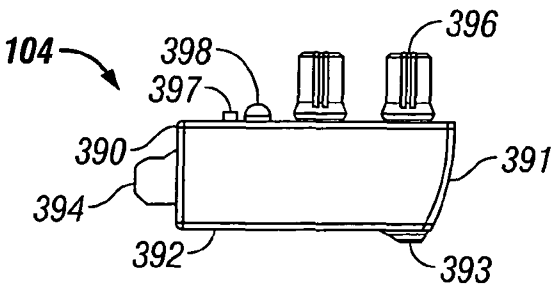
FIG. 3C is a side view of a removable module that may be inserted into an audio processing device, according to one embodiment of the invention.

Examples of a removable module will now be discussed. With reference to FIGS. 3A, 3B, and 3C, top and perspective and side views of the removable module 104 are shown, respectively. As can be seen in these figures, the removable module 104 typically includes an approximately rectangularly-shaped housing 390 having a sloped back end 391 and a planar bottom surface 392 including an approximately triangularly shaped latch portion 393 to mate with the hooked portion 384 of the spring-biased latch 382 such that the removable module is fixedly mounted within the recessed portion 380 of the audio processing device housing 300, as previously discussed; but can easily be removed by simply pushing on the button of the latch 382.

Further, the front portion of the removable module 104 includes a male interface connector 394 to mate with the female interface of the audio processing device 102. For example, as previously discussed, the serial interface may be a 14-pin serial interface associated with the microcontroller 132 of the removable module for mating with an appropriate interface of the printed circuit board of the audio processing device.

Further, the removable module on its top face 395, may include a user interface 136 that may include a plurality of knobs 396 and switches 397 that enable a user to modify parameters associated with the digital audio effect implemented by the particular digital signal processing instructions of the particular removable module in order to produce the desired audio effect. As previously discussed, movement of these controls, or data created as a result of the movement of these controls, is passed from the removable module 104 to the digital signal processor of the audio processing device through the serial interface.

Also, the user interface 136 of the removable module 104 may include a light indicator 398. In one embodiment, a green flashing light is used to indicate that the digital signal processing effect is on and the light flashes to show modulation speed. If the light is amber colored, this indicates that the digital signal processing effect is off, and likewise it flashes to show modulation speed. However, if the light is red and flashing, it indicates that the battery needs replacing.

Figure 4:
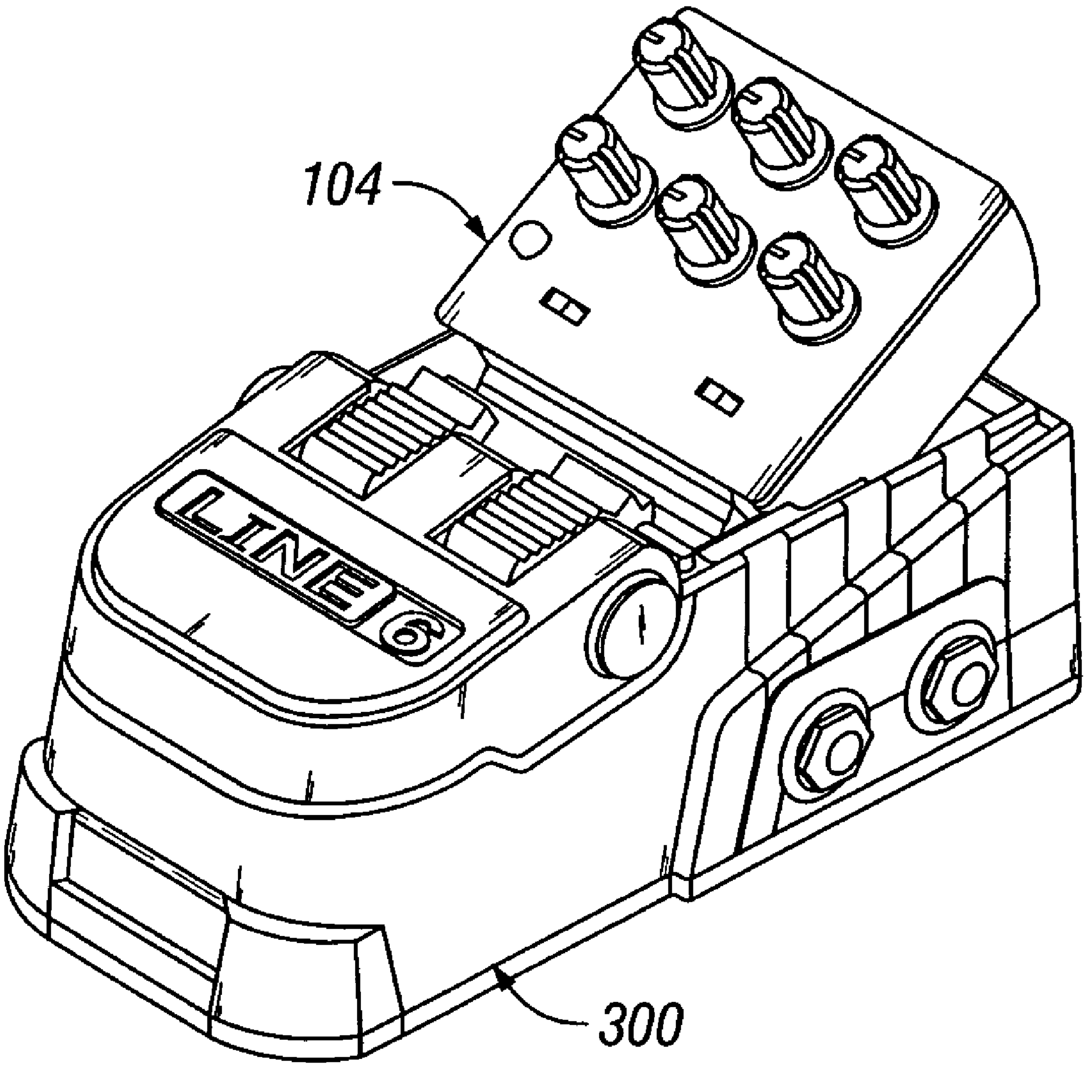
FIG. 4 is a perspective view showing the insertion of a removable module into an audio processing device, according to one embodiment of the invention.

Turning briefly to FIG. 4, FIG. 4 is a perspective view showing the removable module 104 being inserted into the audio processing device housing 300.

Figure 5:
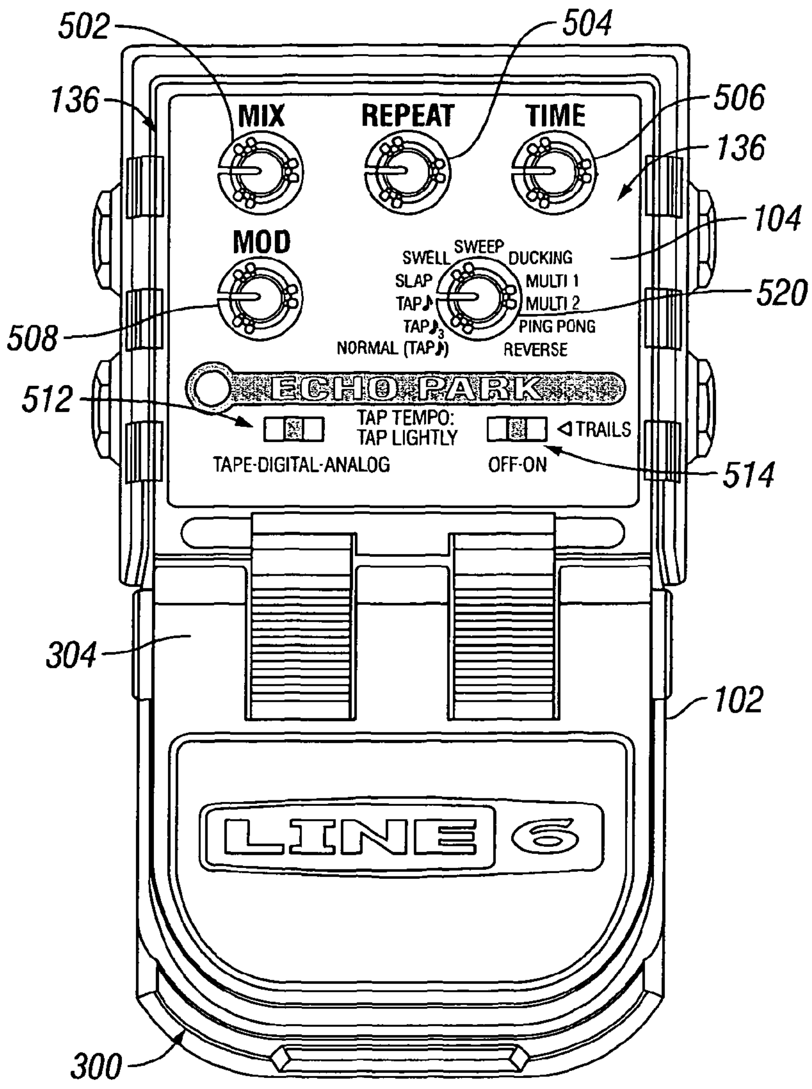
FIG. 5 is a top view showing a removable module directed to echo effects that is fully inserted and coupled to the audio processing device, according to one embodiment of the invention.

Turning now to FIG. 5, FIG. 5 is a top view of an audio processing device 102 having embedded digital signal processing functionality and a removable module having a particular signal processor instruction set and user interface 136 inserted therein.

It should be appreciated that a wide variety of different types of removable modules 104 may be inserted into the base audio processing device 102 in order to create a complete functional audio signal processor. This allows a user to insert a wide variety of different types of removable modules into the same base audio processing device 102 in order to alter the type of effect that it is expected to execute. Examples of the different types of removable modules having particular signal processing instruction sets for particular audio processing effects and particular user interfaces associated therewith include removable modules directed to producing: echo effects, distortion effects, overdrive effects, compressor effects, tremolo effects, chorus effects, etc. It should be appreciated that with the embodiments of the invention a wide variety of different types of digital signal processing effects and appropriate user interfaces implementable by a removable module can be inserted into the base audio processing device 102 having an embedded digital signal processor. This provides a very affordable and versatile solution for adding audio effects to a guitar.

As particularly shown in FIG. 5, in this example, the removable module 104 inserted into the base audio processing device 102 is directed to an echo effect. This removable module is particularly identified as Echo Park™. The audio echo effect more commonly termed "delay" includes a signal processing instruction set to implement a delay effect to an inputted audio signal such as a guitar so that a digitally emulated delay is provided. Signal processing instructions to produce echo and delay effects as stored as a signal processing instruction set of the removable module 104 are well known in the art.

Particularly looking at the user interface and controls, the mix knob 502 allows for the blending of the original audio input signal and the delayed signal. The repeat knob 504 controls the amount of feedback of the output of the delay back to the original audio input signal. The time knob 506 controls the amount of time for the delay. The mod knob 508 (or modulation knob) controls the amount of wow and flutter of a simulated tape delay.

For example, a switch 512 allows for the selection of tape, digital, and analog. When the switch is switched to the tape mode, the tape mode produces a digital effect to simulate tape echo. The tape echo simulates the effect of a recorded audio signal on a magnetic tape. Particularly, it simulates the sound of a playback head that is physically displaced from the record head and the amount of delay is a function of the space between the record and playback head and the tape speed. When switch 512 is set to digital delay, a very pristine digital delay sound is produced. Conversely, when switch 512 is set to analog, this digitally emulates an analog delay sound that is typically associated with old analog circuit delays.

The trail switch 514 enables a trails effect to be on or off. If trails is selected to be on, when the echo or delay effect is turned off, a sound associated with the echo slowly dying off is produced. When the trail switch is turned off, there is no such decay of echoes, the delay just simply ends.

Again, the effects associated with the removable module 104 may be turned on or off by the depressible footpad 304, which may in some embodiments, be a double stage activation switch footpad. Particularly, if the footpad 304 is fully depressed, the effects of the removable module are turned off or on. If the footpad 304 is only slightly depressed, it allows for the tap tempo functions previously discussed.

With reference to knob 520, knob 520 allows a selection of different types of echo or delay. The tap selections produce delays in terms of fractional relationship to speed. Basically, normal means that the tap is set to a quarter note. There are also tap features of eighth note triplets and tap notes in terms of dotted eighth notes. The slap selection provides a very short echo. The swell selection adds a feature where in addition to having echoes a ramp up of volume based on the direct signal is produced. The ducking selection causes the output of the delay to be softer while playing and then the audio output gets louder after the user has stopped playing. The multi-one and multi-two selections provide rhythmic multiple delays that are not evenly spaced. The ping-pong selection selects a delay that goes back and forth between the left and right channel. And, lastly, the reverse selection actually plays the delay backward such that it sounds like the guitar sound is being played backwards.

The previously described removable module 104 related to delay or echo is just one of a plurality of different types of removable modules that can be inserted and played with the audio processing device having embedded digital signal processing capabilities.

Figure 6:
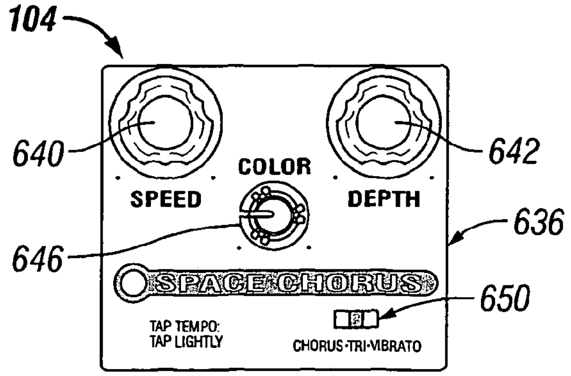
FIG. 6 is a top view of another type of removable module directed to chorus effects, according to one embodiment of the invention.

For example, with reference to FIG. 6, FIG. 6 shows another example of a removable module 104 that contains digital signal processing instructions related to a chorus effect and a user interface 636 directed to allowing the user to modify parameters associated with the chorus effect. Signal processing instructions for chorus effects are well known to those of skill in the art.

When the removable module 104 with space chorus effects is inserted into the audio processing device a user playing (for example) a guitar can fully utilize a wide variety of chorus effects. For example, the speed knob 640 adjusts the effect sound from a slow sweep to a speedy warble. The depth knob 642 allows the depth of the chorus to be changed.

The color knob 646 relates to the type of chorus selected by chorus switch 650. For example, when the chorus switch is set to chorus, the color knob allows for a range of vintage analog tones to modern chorus sounds. When the switch 650 is set to tri, the color knob allows a selection of sounds from warm and mellow to shimmering and bright. When the switch 650 is set to vibrato, the color knob functions as a three-way switch for vintage, blue and euro style sounds.

Accordingly, embodiments of the invention relate to an audio processing device having embedded digital signal processing capabilities that can be utilized with a removable module that stores particular signal processing instructions for producing a particular audio effect and a particular user interface for the desired effect. This provides an affordable and versatile solution to allow for guitarists to easily add a wide variety of different types of guitar effects in a very simple manner. It should be appreciated that although only two types of effects, echo/delay and chorus, have been discussed in detail, that signal processing instructions and effects for a wide variety of different types of guitar user interfaces can be easily implemented in a removable module and utilized with a base audio processing device having embedded digital signal processing capabilities such that a wide degree of variation is possible.

The various aspects of the previously described inventions can be implemented as one or more instructions (e.g. software modules, programs, code segments, etc.) to perform the previously described functions. The instructions which when read and executed by a processor, cause the processor to perform the operations necessary to implement and/or use embodiments of the invention. Generally, the instructions are tangibly embodied in and/or readable from a machine-readable medium, device, or carrier, such as memory, data storage devices, and/or remote devices. The instructions may be loaded from memory, data storage devices, and/or remote devices into memory for use during operations. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components.

While the present invention and its various functional components have been described in particular embodiments, it should be appreciated the embodiments of the present invention can be implemented in hardware, software, firmware, middleware or a combination thereof and utilized in systems, subsystems, components, or sub-components thereof. When implemented in software (e.g. as a software module), the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An audio signal processor to perform an audio processing function upon an input audio signal, comprising:

an audio processing device including a digital signal processor to modify an input audio signal in accordance with a signal processing instruction set, the audio processing device comprising a foot-actuated switch to allow a user to enable and disable digital signal processing functionality performed by the audio processing device;

wherein the input audio signal is an input audio signal from an electric musical instrument; and a removable module for coupling and de-coupling from the audio processing device, the removable module having a signal processing instruction set and having a user interface including at least one control to set a control parameter, wherein, when the removable module is coupled to the audio processing device, the signal processing instruction, set is transferred to and implemented by the digital signal processor of the audio processing device to perform an audio processing function upon the input audio signal, wherein the user interface is particularly designed for the removable module and implemented as part of the removable module such that the control parameter from the removable module is transferred to the digital signal processor of the audio processing device to modify audio processing performed by the audio processing device upon the input audio signal.

2. The audio signal processor of claim 1, further comprising an analog to digital converter to convert an analog audio input signal into a digital input audio signal for processing by the digital signal processor.

3. The audio signal processor of claim 1, further comprising a digital to analog converter to convert a processed digital audio signal modified by the digital signal processor into an analog output signal such that it can be played back by an analog output device.

4. The audio signal processor of claim 1, wherein the foot-actuated switch is hingedly mounted to a housing of the audio processing device.

5. The audio signal processor of claim 4, wherein the footpad switch allows for the selection of a tap tempo mode in which a user controls the tempo of the output audio signal by tapping the footpad switch.

6. The audio signal processor of claim 1, wherein the audio signal processor further comprises a housing having a recess and the removable module is inserted into the recess of the housing.

7. The audio signal processor of claim 6, further comprising a latch located within the recess, wherein the removable module is latched within the audio processing device.

8. The audio signal processor of claim 1, wherein the removable module includes a serial connector for insertion into a serial interface of the audio processing device in order to couple the removable module to the audio processing device.

9. A method to perform an audio processing function upon an input audio signal comprising:

coupling a removable module to an audio processing device, the audio processing device comprising a foot-actuated switch to allow a user to enable and disable digital signal processing functionality performed by the audio processing device;

receiving an input audio signal at the audio processing device, wherein the input audio signal is an input audio signal from an electric musical instrument;

transferring a signal processing instruction set to the audio processing device from a removable module storing the signal processing instruction set, the removable module having a user interface including at least one control to set a control parameter, wherein the user interfaces is particularly designed for the removable module and implemented as part of the removable module such that the control parameter from the removable module is transferred to the digital signal processor of the audio processing device to modify the audio processing function performed by the audio processing device upon the input audio signal based upon the signal processor instruction set.

10. The method of claim 9, further comprising converting an analog audio input signal into a digital input audio signal for audio processing based on the signal processor instruction set.

11. The method of claim 9, further comprising converting a processed digital audio signal modified by the digital signal processor into an analog audio output signal such that it can be played back by an analog output device.

12. The method of claim 9, further comprising allowing a user to select a tap tempo mode and responsive to a user tapping the foot-actuated switch modifying the tempo of the output audio signal.

13. The method claim 9, wherein the removable module is coupled to the audio processing device by inserting the removable module into a recess of a housing of the audio processing device.

14. The method claim 13, wherein coupling the removable module in the recess of the housing further comprises latching the removable module within the recess of the housing of the audio processing device.

15. The method of claim 9, wherein the removable module is coupled to the audio processing device in order to transfer the signal processing instruction set to the audio processing device by a serial interface.

16. A removable module for coupling to an audio processing device in order to create a complete audio signal processor to perform an audio processing function upon an input audio signal, the removable module comprising:

a memory to store a signal processing instruction set;

a connector to mate with a connector interface of the audio processing device to couple the removable module to the audio processing device, the audio processing device comprising a foot-actuated switch to allow a user to enable and disable digital signal processing functionality performed by the audio processing device;

wherein the input audio signal is an input audio signal from an electric musical instrument;

a user interface having at least one control to set a control parameter; and wherein, when the removable module is coupled to the audio processing device, the signal processing instruction set is transferred to and implemented by a digital signal processor of the audio processing device to perform an audio processing function upon an input audio signal received by the audio processing device such that the input audio signal is modified by the digital signal processor based on the signal processing instruction set, wherein the user interface is particularly designed for the removable module and implemented as part of the removable module such that the control parameter from the removable module is transferred to the digital signal processor of the audio processing device to modify audio processing performed by the audio processing device upon the input audio signal.

17. The removable module of claim 16, wherein the audio processing device includes a digital to analog converter to convert a processed digital audio signal modified by the digital signal processor based on the signal processing instruction set received from the removable module and the control parameter received from the removable module into an analog output signal such that it can be played back by an analog output device.

18. The removable module of claim 17, wherein the foot-actuated switch allows a user to enable and disable digital signal processing functionality performed by the audio processing device based on the signal processing instruction set received from the removable module and the control parameter received from the removable module.

19. The removable module of claim 16, wherein the removable module is coupled to the audio processing device by being inserted into a recess of a housing of the audio signal processor.

20. The removable module of claim 19, wherein the removable module is latched within the audio processing device by a latch located within the recess of the housing of the audio processing device.

21. The removable module of claim 16, wherein the connector of the removable module is a serial connector and the serial connector is inserted into a serial connector interface of the audio processing device in order to couple the removable module to the audio processing device.

22. An audio signal processor to perform an audio processing function upon an input audio signal, comprising:

an audio processing device including a digital signal processor to modify an input audio signal in accordance with a signal processing instruction set, wherein the input audio signal is an input audio signal from an electric musical instrument;

a removable module for coupling and de-coupling, from the audio processing device, the removable module including a signal processing instruction set and a user interface having at least one control to set a control parameter, wherein when the removable module is coupled to the audio processing device, the signal processing instruction set is transferred to and implemented by the digital signal processor of the audio processing device to perform an audio processing function upon the input audio signal, wherein the user interface is particularly designed for the removable module and implemented as part of the removable module such that the control parameter from the removable module is transferred to the digital signal processor of the audio processing device to modify audio processing performed by the audio processing device upon the input audio signal; and the audio processing device further comprising a foot-actuated switch with at least three position states, wherein at least one of the three position states alters a function of the digital signal processor in accordance with the signal processing instruction set.

23. The audio signal processor of claim 22, wherein one of the at least three position states includes a half-closed state and in the half-closed state an amount of time that occurs between entering the half-closed state is used to determine an amount of timing for an output signal such that the output signal is outputted from the audio signal processor at a tempo based upon the determined amount of timing.

24. The audio signal processor of claim 23, wherein the at least three position states further include a closed state in which the input audio signal is modified in accordance with a signal processing instruction and an open state in which the input audio signal is not modified in accordance with a signal processing instruction set.

25. The audio signal processor of claim 24, wherein the half-closed state may be utilized in either one of the open state or the closed state.

* * * * *